(12) United States Patent
Wildey

(10) Patent No.: US 7,007,730 B2
(45) Date of Patent: Mar. 7, 2006

(54) APPARATUS AND METHOD FOR SEVERING A TREE AND REDUCING THE TREE STUMP

(75) Inventor: Allan J. Wildey, Paris (CA)

(73) Assignee: Timberjack, Inc., Woodstock (CA)

( * ) Notice: Subject to any disclaimer, the term of this patent is extended or adjusted under 35 U.S.C. 154(b) by 157 days.

(21) Appl. No.: 10/687,323

(22) Filed: Oct. 16, 2003

(65) Prior Publication Data

US 2004/0216809 A1   Nov. 4, 2004

Related U.S. Application Data

(60) Provisional application No. 60/419,905, filed on Oct. 18, 2002.

(51) Int. Cl.
A01G 23/08 (2006.01)

(52) U.S. Cl. .................. 144/336; 144/4.1; 144/34.1

(58) Field of Classification Search ............... 144/4.1, 144/34.1, 24.12, 176, 335, 218; 56/255, 56/295, DIG. 12
See application file for complete search history.

(56) References Cited

U.S. PATENT DOCUMENTS

| | | |
|---|---|---|
| 3,783,914 A | 1/1974 | Daugherty et al. |
| 4,271,879 A | 6/1981 | Shivers, Jr. et al. |
| 4,441,534 A | 4/1984 | Wilson |
| 4,637,442 A | 1/1987 | Mozer |
| 4,697,625 A | 10/1987 | Bolton |
| 4,757,848 A | 7/1988 | Mollberg, Jr. |
| 5,048,579 A | 9/1991 | Lloyd |
| 5,113,919 A * | 5/1992 | MacLennan ............... 144/34.1 |
| 5,381,840 A | 1/1995 | Bowen |
| 5,419,380 A | 5/1995 | Bot |
| 5,499,771 A | 3/1996 | Esposito et al. |
| 5,641,129 A | 6/1997 | Esposito et al. |
| 5,743,315 A | 4/1998 | Esposito et al. |
| 5,857,505 A | 1/1999 | Zagar |
| 5,921,302 A | 7/1999 | Petersen |
| 5,931,210 A * | 8/1999 | Kurelek ...................... 144/336 |
| 6,105,351 A * | 8/2000 | Itoh ............................. 56/235 |
| 6,668,880 B1 * | 12/2003 | Nordstrom ................... 144/4.1 |

OTHER PUBLICATIONS

Quadco; photograph of brush cutter displayed at the Oregon Logging Conference Show in Portland, Oregon; 02-2002.

* cited by examiner

Primary Examiner—Derris H. Banks
Assistant Examiner—Shelley Self
(74) Attorney, Agent, or Firm—Quarles & Brady LLP

(57) ABSTRACT

An apparatus and method for harvesting trees and reducing their stumps is disclosed. The apparatus includes a rotating member including an upper disc saw blade and a lower stump grinding drum blade. The disc saw blade severs the tree from its stump, and thereafter the drum blade reduces the height of the stump down to at or near ground level.

18 Claims, 1 Drawing Sheet

APPARATUS AND METHOD FOR SEVERING A TREE AND REDUCING THE TREE STUMP

CROSS-REFERENCE TO RELATED APPLICATION

This claims the benefit of U.S. Provisional Patent Application No. 60/419,905 filed Oct. 18, 2002.

STATEMENT OF FEDERALLY SPONSORED RESEARCH OR DEVELOPMENT

Not applicable.

FIELD OF THE INVENTION

The present invention relates to equipment used in the harvesting of trees and, more particularly, relates to mechanisms for cutting down trees and to mechanisms for grinding the stump remnants of those trees.

BACKGROUND OF THE INVENTION

High-speed disc saw felling heads (DSFH) are commonly used to harvest trees. DSFHs typically include a large circular blade with a cutting diameter of 52 to 60 inches that is rotated continuously about a generally vertical axis at a high speed of approximately 1200 r.p.m. Replaceable teeth are mounted around the circumference of the blade. To cut a tree, the rotating blade is advanced toward and through the trunk of the tree at an elevation above ground level, and generally parallel to the ground, rotating about an axis that is generally parallel to the tree trunk.

Although driven by a motor such as a hydraulic motor, the rotational speed of the blade typically diminishes the longer the blade is cutting through any given tree. In order to keep the rotational speed sufficiently high that the blade is able to cut through a given tree in a single cut (e.g., without removing the blade from the tree to allow it to speed up again), the DSFH typically relies upon the high rotational momentum of the blade to keep the blade rotating for a sufficiently long time to cut through the tree.

In a feller buncher, during severance of the tree, the tree advances over the circular blade, as the vehicle is driven forward, and onto a butt plate. Hydraulically-actuated grapple arms then close around the tree, retaining it in a vertical attitude. This is sometimes referred to as a cut and catch operation. Several trees can be harvested and stored (bunched) in a vertical orientation before being dumped as a bunch into a pile ready for subsequent removal and processing. Piling groups of trees in this manner, rather than individually, improves harvesting efficiency. Fellers have also been used which only cut and do not accumulate or bunch the cut trees.

Although DSFHs allow for efficient harvesting of trees, the cutting action of the blade typically must occur within a horizontal plane (horizontal meaning generally perpendicular to the tree trunk) that is some distance above the ground. If the blade severs the trees closer to the ground, the blades of the DSFHs experience high rates of wear due to the erosive effects of earth and/or sand being propelled into the housing of the machine. Repairing such worn-out DSFHs is expensive.

Because the blades of the DSFHs must operate away from the ground, sizable stumps are left when trees are severed by the DSFHs. This is undesirable since large stumps can be unsightly, can delay the decomposition of the root systems of felled trees, and can cause a variety of other problems such as damage to the tires of other logging equipment, especially log skidders.

Due to the problems associated with leaving sizable stumps, the severing of trees by DSFHs often is followed by the use of stump grinding machines. These machines typically have a stump grinding drum rotated about a generally horizontal axis or teeth on a horizontal axis rotating disc that moves back and forth axially through the stump. While such machines are able to fragment the stumps or brush, stump grinding is not only expensive insofar as it constitutes a distinct, second operation that must be performed in the tree-felling process, but also is expensive insofar as the stump grinding machines themselves are expensive to rent/own and operate.

A known brush mulcher has teeth in two radially extending spiral patterns spaced 180° apart on the bottom of a rotating blade having teeth like a disc saw blade. The brush mulcher blade is typically lowered on top of the brush or brush stems to mulch them. It is conceivable that it could also be used for severing very small trees and mulching their stumps in a horizontal direction. However, it could not be efficiently used for combined tree harvesting and stump reduction in commercial logging operations.

It therefore would be advantageous if a new apparatus and method could be developed that simplified and reduced the costs associated with harvesting trees and reducing stumps. It would in particular be advantageous if the new apparatus and method allowed for the rapid severing and harvesting of trees in a manner that did not leave behind large tree stumps. It would further be advantageous if the new apparatus and method was relatively inexpensive and simple to implement.

SUMMARY OF THE INVENTION

The present invention provides, below the disc saw blade of a DSFH used to sever the trunks of trees, an additional stump grinding drum blade that fragments the stumps of those trees. The drum blade extends downward from the disc saw blade to mulch the stump as the head is advanced horizontally through the stump.

In particular, the present invention relates to an apparatus for harvesting trees, where the apparatus includes a rotating member having an upper rotating disc saw blade and a lower rotating drum blade. The disc blade has teeth distributed around its circumference which define a cutting width for severing a tree from its stump, and the drum blade has an outer periphery which establishes a reducing width below the disc saw for grinding the stump at the head is advanced in the cutting direction. The apparatus further includes a support for the rotating member, and a motor coupled to the rotating member capable of rotating the blades.

Preferably, the drum blade extends downward from the disc saw blade by a distance that is a substantial proportion of the distance separating the main blade from the ground, so as to reduce the height of the stump, preferably to at or near ground level.

The drum blade preferably has a radius (and circumference) that is significantly smaller than that of the disc blade. Consequently, the fragmentation of a stump of a tree does not occur until the trunk of the tree (or at least a substantial proportion of the trunk) has been severed from the stump of the tree, such that the DSFH is not overly loaded by both the severing action of the main blade and the pulverizing action of the drum blade.

The present invention also provides a method of harvesting trees, wherein the tree is first severed with a disc saw blade, and thereafter the stump is reduced in height by a stump grinding drum which has a vertical axis and is below the disc saw blade.

These and other objects and advantages of the invention will be apparent to those skilled in the art from the detailed description and drawings.

DETAILED DESCRIPTION OF THE PREFERRED EMBODIMENTS

Figure 1:
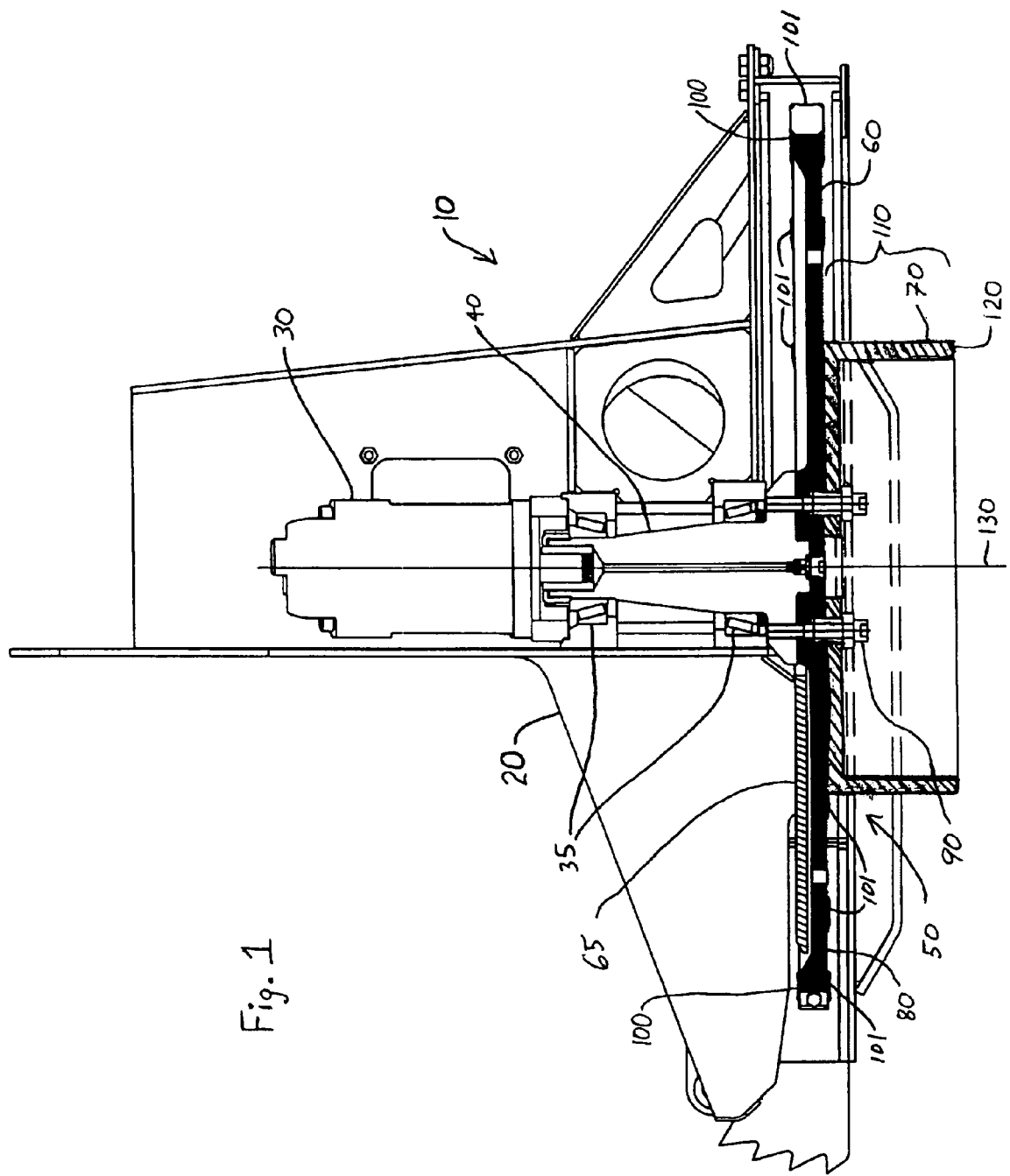
FIG. 1 is a cross-sectional view of a modified DSFH having an additional lower blade in accordance with the present invention.

Referring to FIG. 1, a modified DSFH 10 includes a support frame 20 and a motor 30 positioned on the support frame. The motor 30 can be a hydraulic motor or any other type of motor capable of providing sufficient output power to operate the DSFH 10. The motor 30 is connected to a rotating member 50 which is below butt plate 65, which supports the bottoms of cut trees as they are accumulated by DSFH 10, by way of an axle 40, which is supported by way of bearings 35 with respect to the support frame 20. The rotating member 50 includes both an upper, disc saw blade 60 and a lower stump reducing drum blade 70, also referred to as stump grinding drum blade 70, that extends from an underside 80 of the disc blade 60.

Depending upon the embodiment, the disc and drum blades 60, 70 can be integrally formed as a single piece, or can be two distinct pieces that are attached to one another and/or to the axle 40 (e.g., by way of bolts 90). Because in the embodiment of FIG. 1 the two blades 60, 70 are at least coupled to the same axle 40, the two blades are coaxial about a generally vertical axis (i.e., generally parallel to the ground or perpendicular to the tree trunk) and rotate at the same speed. However, in alternate embodiments, it is possible that the two blades could rotate at different speeds. Further, in alternate embodiments, the two blades may be rotated by separate axles, drive trains, or motors.

The disc blade 60 has teeth 101 spaced apart and disposed continuously circumferentially around its outer circumference 100, radially outside of the outer edge of the butt plate 65, as is conventional in disc saw felling head blades. The teeth 101 of the disc blade 60 are relatively narrow in cross-sectional width (e.g., approximately 2–3 inches or less), such that the upper blade produces a relatively narrow kerf of approximately the same width when trees are felled. While the trees are cut, they are pushed onto a butt plate 65 (by the forward motion of the machine carrying the DSFH 10), where the butt end of the tree is supported as additional trees are cut and accumulated. The circumference 100 and diameter of the upper blade 60 typically is large (e.g., a diameter of 52 to 60 inches), and the disc blade 60 also has a relatively large weight such that it attains a large rotational momentum when rotated by the motor 30 at high speeds (e.g., 1200 r.p.m.).

The lower, or drum blade 70, which extends downward from the bottom of the upper, or disc blade 60 by a reducing width 110 (also referred to herein as grinding width 110), also may include teeth (not shown) disposed continuously and spaced apart around its outer circumference 120, or other structures which fragment, cut, pulverize, grind, mulch, or otherwise reduce a stump in height for the reducing width 110 (i.e. the width in the axial direction) of the blade 70. The reducing width 110 starts at the bottom of the blade 60 and preferably equals, or at least is a substantial proportion of, the height at which the disc blade is typically operated in relation to the ground to sever trunks of trees, so as to reduce the stump in height down to at or near ground level with a single horizontal pass of the blade 70 through the stump. The reducing width 110 typically will be greater than the cutting width (in the axial direction) of the disc blade 60. Because the blade 70 defines a cutting periphery at the tips of its cutting elements which is drum shaped, (i.e. generally circular radially and extending axially) for the reducing width 110 when the blade 70 is rotated in operation, the blade 70 in the preferred embodiment is referred to as a drum. In the preferred embodiment it is cylindrical, but it is conceivable that it would not necessarily have to be cylindrical but could be conical or frusto-conical, tapering either up or down, or another shape which presents a continuous, generally circular cutting swath to the stump.

Thus, the lower blade 70 is advanced generally horizontally through the stump to reduce it, turning the fragmented portion of the stump into mulch. The teeth of the drum blade 70 are designed to engage and mulch a stump of a tree after the trunk of the tree has been completely (or largely) severed by the upper blade 60. That is, the modified DSFH 10 cuts the tree from its stump and mulches the stump of a tree by moving the rotating member 50 so that a central axis 130 of the member moves generally horizontally (i.e., moving generally perpendicular to the tree trunk with the axis 130 generally parallel to the tree trunk) toward the trunk so that first the upper blade 60 engages the tree trunk and then the lower blade 70 engages the stump of the tree.

The teeth of both the disc and drum blades 60, 70 can be either removably attached or integrally formed with the respective blades. The exact location of the teeth of the drum blade 70 in relation to the underside of the upper blade 60 (e.g., spaced along the distance 110) can vary depending upon the embodiment. In some embodiments, the teeth extend the entire distance 110 along the circumference 120 of the lower blade 70, such that the lower blade 70 has, a gear-like appearance, from a, top view. In other embodiments, two or more discrete rings of teeth may be positioned along the circumference 120 of the drum blade 70, with each ring spaced at different locations from the underside 80 along the distance 110 and the teeth of each ring spaced apart circumferentially. The teeth of one ring may also be staggered circumferentially from the teeth in another ring or each ring could be in an axially extending spiral or helical pattern, and the patterns staggered from one another. Any pattern of teeth or cutting elements on the drum blade 70 which presents a continuous circular cutting swath to the stump in a generally horizontal plane at the speed the blade 70 is operated will work. This distinguishes brush cutter arrangements in which teeth were mounted on the underside of a disc saw blade in two radially extending spiral patterns angularly spaced 180° apart, which were used for mulching and clearing brush. The 180° opposed teeth of each spiral pattern in those arrangements are not close enough angularly so as to present a continuous circular cutting path in a generally horizontal plane, but present a complex shape pattern having a major axis dimension significantly greater than its minor axis dimension. In any event, it is preferable that the teeth on the mulching blade 70 be as coarse as possible since they must only fragment the stump into pieces which are as large as possible. This is one way in which energy demand is minimized.

Although the motor 30 may be powerful and the cutting width of the disc blade 60 may be narrow, the upper blade 60 nevertheless tends to slow down as the time spent severing a given tree trunk is extended. To increase the cutting power of the upper blade 60, the upper blade is given a significant weight, such that its rotational momentum is large. The large rotational momentum makes it possible for the upper blade 60 to continue rotating at high speeds for a longer time than would otherwise be the case.

While increased rotational momentum of the disc blade 60, combined with large engine power and narrow cross-sectional width of the upper blade, enables more effective severing of tree trunks, these attributes nevertheless would be insufficient to maintain desired rotation of the rotating member 50 if the disc blade 60 was in contact with the tree trunk throughout the same period of time as when the drum blade 70 was reducing the tree stump. Consequently, in the present embodiment, the drum mulching blade 70 is designed to have a significantly smaller circumference 120 (and diameter) than the disc blade 60 (e.g., in one embodiment, the diameter of the lower blade is twenty inches less than that of the upper blade).

With such a design, the lower blade 60 only comes into contact with a tree stump after the tree trunk has already been completely or substantially severed. Thus, the power drain due to the pulverizing action of the lower blade 70 only occurs after the power drain due to the severing action of the upper blade 60 has ended (or largely ended), and so the modified DSFH 10 is able to successfully achieve both severing of the tree trunk and pulverizing of the tree stump. Assuming a difference in the diameters of the disc and drum blades 60, 70 of 20 inches, the modified DSFH 10 is most effective in cutting and stump reducing trees having diameters of 10 inches or less.

Also, it is noted that the upper disc 60 (even without the blade 70) is inherently effective for somewhat less than half its diameter. The lower blade 70, on the other hand is able to travel completely through the stump, and out the other side, so its full diameter is effective.

While the foregoing illustrates and describes the preferred embodiments of this invention, it is to be understood that the invention is not limited to the precise construction herein disclosed. The invention can be embodied in other forms without departing from the spirit or essential attributes of the invention. Accordingly, reference should be made to the following claims, rather than to the foregoing specification, as indicating the scope of the invention.

I claim:

1. A disc saw felling head for harvesting trees and simultaneously removing stumps comprising:
    a rotating member having a generally vertical axis of rotation when cutting a standing tree, the rotating member including:
    an upper disc saw blade having teeth distributed around an outer circumference of the blade to define an upper cutting width for severing a tree from a stump when the disc saw blade is rotated and advanced generally horizontally through the tree; and
    a lower stump reducing drum blade having a radially arcuate drum body extending axially a reducing width which presents a generally circular cutting swath to a stump in a direction perpendicular to the axis of the rotating member and which extends downwardly from the disc saw blade so as to reduce the height of the stump left after the disc saw blade has severed the tree by advancing the drum blade generally horizontally through the stump;
    a support for the rotating member; and
    at least one motor coupled to the rotating member capable of rotating both blades of the rotating member.

2. A disc saw felling head for harvesting trees and simultaneously removing stumps comprising:
    a rotating member having a generally vertical axis of rotation when cutting a standing tree, the rotating member including:
    an upper disc saw blade having teeth distributed around an outer circumference of the blade to define an upper cutting width for severing a tree from a stump when the disc saw blade is rotated and advanced generally horizontally through the tree; and
    a lower stump reducing drum blade having a reducing width which presents a generally circular cutting swath to a stump in a direction perpendicular to the axis of the rotating member and which extends downwardly from the disc saw blade so as to reduce the height of the stump left after the disc saw blade has severed the tree by advancing the drum blade generally horizontally through the stump;
    a support for the rotating member; and
    at least one motor coupled to the rotating member capable of rotating both blades of the rotating member;
    wherein the reducing width of the drum blade extends downwardly from the disc saw blade by a distance greater than the cutting width of the disc saw blade, and the reducing width mulches the stump over substantially an entire width of the stump.

3. The apparatus of claim 2, wherein the reducing width of the drum blade extends downwardly from the disc saw blade to essentially ground level.

4. The apparatus of claim 2, wherein the drum blade is coaxial with the disc saw blade.

5. The apparatus of claim 2, wherein the drum blade is rotated by the same motor as the disc blade.

6. A disc saw felling head for harvesting trees and simultaneously removing stumps comprising:
    a rotating member having a generally vertical axis of rotation when cutting a standing tree, the rotating member including:
    an upper disc saw blade having teeth distributed around an outer circumference of the blade to define an upper cutting width for severing a tree from a stump when the disc saw blade is rotated and advanced generally horizontally through the tree; and
    a lower stump reducing drum blade having a reducing width which presents a generally circular cutting swath to a stump in a direction perpendicular to the axis of the rotating member and which extends downwardly from the disc saw blade so as to reduce the height of the stump left after the disc saw blade has severed the tree by advancing the drum blade generally horizontally through the stump;
    a support for the rotating member; and
    at least one motor coupled to the rotating member capable of rotating both blades of the rotating member;
    wherein the disc saw blade is significantly larger in radius than the drum blade.

7. The apparatus of claim 6, wherein the disc saw blade is approximately 10 or more inches larger in radius than the drum blade.

8. The apparatus of claim 2, wherein the drum blade reduces the height of the stump to essentially ground level in a single pass.

9. A method of harvesting trees comprising the steps of: simultaneously rotating and advancing a disc saw blade through a standing tree so as to produce a kerf in the tree that severs the tree from a stump of the tree; after initial severance of the tree and with the disc saw blade over the stump, simultaneously rotating and advancing a stump grinder drum blade through the stump in a direction generally perpendicular to the axis of a trunk of the standing tree to reduce the height of the stump, the stump grinder drum blade having a radially arcuate drum body extending axially a reducing width along an axis of rotation which is generally parallel to the tree trunk, being positioned below the disc saw blade and presenting a generally circular cutting swath to the stump as the drum blade is advanced through the stump in a direction which is generally perpendicular to the trunk of the tree.

10. A method of harvesting trees comprising the steps of: simultaneously rotating and advancing a disc saw blade through a standing tree so as to produce a kerf in the tree that severs the tree from a stump of the tree; after initial severance of the tree and with the disc saw blade over the stump, simultaneously rotating and advancing a stump grinder drum blade through the stump in a direction generally perpendicular to the axis of a trunk of the standing tree to reduce the height of the stump, the stump grinder drum blade having an axis of rotation which is generally parallel to the tree trunk, being positioned below the disc saw blade and presenting a generally circular cutting swath to the stump as the drum blade is advanced through the stump in a direction which is generally perpendicular to the trunk of the tree; and accumulating a plurality of cut trees on a butt plate of a head supporting said disc saw blade and said stump grinder.

11. In a disc saw felling head having a frame, a butt plate for supporting the cut ends of trees, a disc saw blade below the butt plate having teeth radially outside of an outer edge of the butt plate and distributed around an outer circumference of the blade to define an upper cutting width for severing a standing tree from a stump when the disc saw blade is rotated and advanced generally horizontally through the tree and a motor for rotating the disc saw blade, the improvement wherein the head also comprises a stump grinder drum blade which is rotatably driven by the head and is advanced through the stump in a generally horizontal direction to reduce the height of the stump, the stump grinder drum blade having an axis of rotation which is generally parallel to a trunk of the tree, being positioned below the disc saw blade and presenting a generally circular cutting swath to the stump as the drum blade is rotated and advanced through the stump in a generally horizontal direction.

12. The apparatus of claim 11, wherein the drum blade extends downwardly from the disc saw blade by a distance greater than the cutting width of the disc saw blade.

13. The apparatus of claim 12, wherein the drum blade extends downwardly from the disc saw blade to essentially ground level.

14. The apparatus of claim 11, wherein the drum blade is coaxial with the disc saw blade.

15. The apparatus of claim 11, wherein the drum blade is rotated by the same motor as the disc blade.

16. The apparatus of claim 11, wherein the disc saw blade is significantly larger in radius than the drum blade.

17. The apparatus of claim 16, wherein the disc saw blade is approximately 10 or more inches larger in radius than the drum blade.

18. The apparatus of claim 11, wherein the drum blade reduces the height of the stump to essentially ground level in a single pass.

* * * * *